US011317100B2

(12) United States Patent
Filippov et al.

(10) Patent No.: US 11,317,100 B2
(45) Date of Patent: Apr. 26, 2022

(54) DEVICES AND METHODS FOR VIDEO CODING

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 16/734,022

(22) Filed: Jan. 3, 2020

(65) Prior Publication Data

US 2020/0145667 A1 May 7, 2020

Related U.S. Application Data

(63) Continuation of application No. PCT/RU2017/000490, filed on Jul. 5, 2017.

(51) Int. Cl.
*H04N 19/159* (2014.01)
*H04N 19/172* (2014.01)
*H04N 19/176* (2014.01)

(52) U.S. Cl.
CPC ......... *H04N 19/159* (2014.11); *H04N 19/172* (2014.11); *H04N 19/176* (2014.11)

(58) Field of Classification Search
CPC .. H04N 19/159; H04N 19/172; H04N 19/176; H04N 19/137; H04N 19/593; H04N 19/11
See application file for complete search history.

(56) References Cited

U.S. PATENT DOCUMENTS

2005/0265447 A1* 12/2005 Park .................. H04N 19/176
375/240.03

2011/0293001 A1 12/2011 Lim et al.
(Continued)

FOREIGN PATENT DOCUMENTS

CN 102209243 A 10/2011
CN 105393534 A 3/2016
(Continued)

OTHER PUBLICATIONS

Galpin et al., "Adaptive Clipping in JEM2.0," Joint Video Exploration Team (JVET) of ITU-T SG16 WP3 and ISO/IEC JTC1/SC29/WG11, 3rd Meeting: Geneva, CH, JVET-C0040-r3, XP030150130, pp. 1-7, International Telecommunication Union, Geneva, Switzerland (May 26-Jun. 1, 2016).
(Continued)

*Primary Examiner* — Boubacar Abdou Tchoussou
(74) *Attorney, Agent, or Firm* — Leydig, Voit & Mayer, Ltd.

(57) ABSTRACT

A video coding block is intra-predicted on the basis of reference samples from a set of neighboring video coding blocks. A preliminary fitting plane, defined by a set of preliminary fitting plane parameters, is determined on the basis of the reference samples. Those preliminary fitting plane parameters whose parameter value lies outside a predefined range of allowable parameter values are clipped to an adjusted parameter value inside the predefined range. Those preliminary fitting plane parameters whose parameter value lies within the predefined range of allowable parameter values are maintained. An adjusted fitting plane is determined on the basis of the clipped fitting plane parameters and the unclipped fitting plane parameters. The adjusted fitting plane defines a plurality of fitting samples. The samples of the current video coding block are defined on the basis of the plurality of fitting samples.

16 Claims, 6 Drawing Sheets

(56) References Cited

U.S. PATENT DOCUMENTS

2012/0287995 A1   11/2012   Budagavi
2012/0294358 A1*  11/2012   Suzuki .................. H04N 19/11
                                                          375/240.12

FOREIGN PATENT DOCUMENTS

| EP | 3013049 A1 | 4/2016 |
|---|---|---|
| KR | 20130118219 A | 10/2013 |
| WO | 2014110568 A1 | 7/2014 |
| WO | 2016066093 A1 | 5/2016 |

OTHER PUBLICATIONS

"Information technology—High efficiency coding and media delivery in heterogeneous environments—Part 2: High efficiency video coding," International Standard, First Edition, ISO/IEC 23008-2, pp. 1-13, International Organization for Standardization/ International Electrotechnical Commission, Switzerland (Dec. 1, 2013).

"Series H: Audiovisual and Multimedia Systems Infrastructure of audiovisual services—Coding of moving video, High efficiency video coding," Recommendation of ITU-T H.265, ITU-T Telecommunication Standardization Sector of ITU, H.265, pp. 1-664, International Telecommunication Union, Geneva, Switzerland (Dec. 2016).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

Galpin et al., "EE7 Adaptive Clipping in JEM3.0," Joint Video Exploration Team (JVET) of ITU-T SG 16 WP 3 and ISO/IEC JTC 1/SC 29/WG 11, 4th Meeting: Chengdu, CN, JVET-D0033-r2, pp. 1-10, International Telecommunication Union, Geneva, Switzerland (Oct. 15-21, 2016).

"Future video coding: Joint Exploration Model 1 (JEM1) for future video coding investigation," Telecommunication Standardization Sector, Study Group 16, TD 213 (WP 3/16), pp. 1-20, International Telecommunication Union, Geneva, Switzerland (Oct. 12-23, 2015).

Huang et al., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, JVET-C0024, pp. 1-5, International Telecommunication Union, Geneva, Switzerland (May 26-Jun. 1, 2016).

CN/201780092228.X, Office Action/Search Report, dated Jun. 3, 2021.

* cited by examiner

DEVICES AND METHODS FOR VIDEO CODING

CROSS-REFERENCE TO RELATED APPLICATIONS

This application is a continuation of International Application No. PCT/RU2017/000490, filed on Jul. 5, 2017, the disclosure of which is hereby incorporated by reference in its entirety.

TECHNICAL FIELD

The disclosure relates to the field of video coding. More specifically, the disclosure relates to an apparatus and a method for intra prediction of a video coding block as well as an encoding apparatus and a decoding apparatus comprising such an intra-prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into video coding blocks. Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress. The use of sophisticated prediction coding (such as motion compensation and intra-prediction) and partitioning techniques (e.g., quadtree for CUs and PUs as well as residual quadtree for TUs in the HEVC/H.265 standard and quadtree plus binary tree for the JEM reference software from version JEM-3.0 onwards) allowed the standardization committee to significantly reduce the redundancy in PUs. The fundamental difference between the quadtree (QT) and quadtree plus binary tree (QTBT) partitioning mechanisms is that the latter one enables not only square but also rectangular blocks by using partitioning based on both quad- and binary-tree.

In the H.264/AVC standard, four intra-prediction modes were available for 16×16 blocks for a luma color component. One of those modes is plane-based and can predict a source-signal gradient within a block. The formula used to calculate pixels to be predicted using the plane-based mode is expressed as follows:

$$p_{pred}[x,y]=\mathrm{clip3}(0,2^n-1,(a+b(x-7)+c(y-7)+16)>>5),$$

where a, b and c are plane (multiple regression) parameters. It is worth noting that the clip3 function, $p_{pred}[x, y]=\mathrm{clip3}(p^*_{min}, p_{max}, \hat{p}_{pred}[x,y])$, is used in the equation above. In the clip3 function, $p_{min}$ and $p_{max}$ are the minimum and maximum values of pixels that are possible for a given bit depth (e.g., $p_{min}=0$ and $p_{max}=255$ for bit depth 8) respectively; $\hat{p}_{pred}[x, y]$ and $p_{pred}[x, y]$ are values of predictors at the position [x, y] before and after clipping respectively.

According to the HEVC/H.265 standard, 35 intra prediction modes are available and include a planar mode (the intra-prediction mode index is 0), a DC mode (the intra-prediction mode index is 1), and 33 directional modes (the intra-prediction mode index ranges from 2 to 34). From the JEM-1.0 software onwards, the set of directional intra-prediction modes has been extended up to 65 modes (almost doubled) by decreasing a step angle between directional intra-prediction modes by a factor of 2. As seen from the listed modes above, the plane-based mode was adopted neither for HEVC/H.265 nor for the JEM software. In fact, this mode was replaced by the planar one that does not always result in a plane-based predictor.

As discussed in "EE7 Adaptive Clipping in JEM3.0" by F. Galpin et al., Contribution JVET-D0033 to the $4^{th}$ JVET meeting, China, 2016, the adaptive clipping mechanism, initially proposed in "Adaptive Clipping in JEM2.0" by F. Galpin et al., Contribution JVET-C0040 to the $3^{rd}$ JVET meeting, Switzerland, 2016, is used to restrict pixel values in blocks (e.g., in a predictor) from the JEM-4.0 software onwards. This technique uses clipping bounds that are determined at the encoder side and are explicitly signaled in the bit-stream, namely, in slice headers. Clipping bounds are defined as actual minimum $p_{min}(C)$ and maximum $p_{max}(C)$ sample values of coded pictures separately for every color component. Mathematically, adaptive clipping operation can be presented as follows:

$$p_{pred}(x,y,C) = \text{clip3}(p_{min}(C), p_{max}(C), \hat{p}_{pred}(x,y,C)) = \text{clip} A(\hat{p}_{pred}(x,y,C),C),$$

where C is an index of a selected color component. This mechanism, similar to the clip3( ) function, is directly applied to pixel values, e.g., within a predictor.

Prediction of a block may include steps of generating secondary reference samples that are located on the sides of the block that are not yet reconstructed and to be predicted, i.e. unknown pixels. Values of these secondary reference samples are derived from the primary reference samples which are obtained from the pixels of the previously reconstructed part of the picture, i.e., known pixels. Evidently, the block that is decoded first within a picture cannot be predicted using previously reconstructed pixels. The same situation occurs when a side of the block to be predicted is out of the picture boundary. In this situation primary reference samples are generated using a pre-defined set of rules. In case of H.265/HEVC standard, they are assigned to a value equal to half of the possible maximal value of a pixel that is determined by a bit depth of the corresponding picture color plane. There are different methods that generate secondary reference samples for predicting a block. Since values of the secondary reference samples depend on the primary reference samples, the step of calculating them could be performed implicitly when prediction of a pixel value is calculated. The planar intra-prediction mode of H.265/HEVC standard is an example of such a method.

However, the plane-based intra prediction mode has a major problem: the regression (plane) parameters are being determined without taking into account constraints caused by actual pixel values. Therefore, the current plane-based mode for intra-prediction suffers from low compression efficiency.

In light of the above, there is a need for improved devices and methods for video coding, which allow increasing the coding efficiency for intra-prediction.

SUMMARY

It is an object of the disclosure to provide improved devices and methods for video coding, which allow increasing the coding efficiency for intra-prediction.

The foregoing and other objects are achieved by the subject matter of the independent claims. Further implementation forms are apparent from the dependent claims, the description and the figures.

Generally, the disclosure relates to hybrid video coding, in particular intra-prediction. More specifically, the disclosure provides an improvement of intra-prediction by combining a plane-based intra-prediction mode previously used in the H.264/AVC standard with a mechanism of clipping plane parameters, which provides better coding efficiency than conventional plane-based intra prediction modes. According to the disclosure, clipping of plane parameters is provided to avoid values of the plane parameters that are a priori impossible.

In contrast to conventional approaches, embodiments of the disclosure allow applying the clipping operation to both plane (regression) parameters as well as pixel values in a predictor generated by a plane-based mode. Constraints for clipping plane (regression) parameters can be defined, for instance, by: pixel values that are possible for a given bit depth (e.g., $p_{min}=0$ and $p_{max}=255$ for a bit depth 8); actual minimum and maximum sample values appearing in coded pictures; and/or minimum and maximum values of reference samples used for generating a fitting plane.

Thus, embodiments of the disclosure provide in particular the following advantages: firstly, additional gain of coding can be reached by integrating embodiments of the disclosure into a codec. Secondly, embodiments of the disclosure can be used in many potential applications in hybrid video coding paradigms that are compatible with the HM software and the VPX video codec family as well as the JEM software and the VPX/AV1 video codec family, i.e., a state-of-the-art and next-generation video coding frameworks, respectively. Thirdly, hardware and computational complexities can be kept low at both encoder and decoder sides. Finally, embodiments of the disclosure can be easily implemented in codecs that use conventional intra-prediction mechanisms.

The following disclosure employs a plurality of terms which, in embodiments, have the following meaning: Slice—a spatially distinct region of a picture that is independently encoded/decoded. Slice header—Data structure configured to signal information associated with a particular slice. Video coding block (or short block)—an M×N (M-column by N-row) array of pixels or samples (each pixel/sample being associated with at least one pixel/sample value), or an M×N array of transform coefficients. Coding Tree Unit (CTU) grid—a grid structure employed to partition blocks of pixels into macro-blocks for video encoding. Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples. Picture Parameter Set (PPS)—a syntax structure containing syntax elements that apply to zero or more entire coded pictures as determined by a syntax element found in each slice segment header. Sequence Parameter Set (SPS)—a syntax structure containing syntax elements that apply to zero or more entire coded video sequences as determined by the content of a syntax element found in the PPS referred to by a syntax element found in each slice segment header. Video Parameter Set (VPS)—a syntax structure containing syntax elements that apply to zero or more entire coded video sequences. Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples. Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples. Supplemental enhancement information (SEI)—extra information that may be inserted into a video bit-stream to enhance the use of the video. Luma—information indicating the brightness of an image sample. Chroma—information indicating the color of an image sample, which may be described in terms of red difference chroma component (Cr) and blue difference chroma component (Cb).

More specifically, according to a first aspect the disclosure relates to an apparatus for intra prediction of a current video coding block of a frame of a video signal on the basis of a plurality of reference samples from a set of neighboring video coding blocks of the current video coding block, the frame comprising a plurality of samples, each sample being associated with a sample value and a position within the frame. The apparatus comprises a processing unit configured to: determine a preliminary fitting plane on the basis of the plurality of reference samples, wherein the preliminary fitting plane is defined by a set of preliminary fitting plane parameters; clip those preliminary fitting plane parameters of the set of preliminary fitting plane parameters whose parameter value lies outside of a predefined range of allowable parameter values to an adjusted parameter value lying inside of the predefined range of allowable parameter values and maintain those preliminary fitting plane parameters of the set of preliminary fitting plane parameters whose parameter value lies inside of the predefined range of allowable parameter values; determine an adjusted fitting plane on the basis of the clipped fitting plane parameters and the unclipped fitting plane parameters, wherein the adjusted fitting plane defines a plurality of fitting samples, each fitting sample being associated with a fitting sample value and a position within the frame; and predict the samples of the current video coding block on the basis of the plurality of fitting samples defined by the adjusted fitting plane.

Thus, an improved apparatus for video coding is provided, which allows increasing the coding efficiency for intra prediction.

In a further possible implementation form of the first aspect, the processing unit is configured to determine the fitting plane on the basis of the plurality of reference samples by determining the set of fitting plane parameters, including a first fitting plane parameter a, a second fitting plane parameter b and a third fitting plane parameter c on the basis of the plurality of reference samples such that the plurality of fitting sample values $\hat{p}_{pred}[x, y]$ are defined by the following equation:

$$\hat{p}_{pred}[x,y]=ax+by+c,$$

wherein x, y denote the position of the fitting sample within the frame.

In a further possible implementation form of the first aspect, the processing unit is configured to perform a multi-linear regression, in particular a least squares method, for determining the fitting plane parameters on the basis of the plurality of reference samples.

In a further possible implementation form of the first aspect, the processing unit is configured to clip the first fitting plane parameter a and/or the second fitting plane parameter b and to adjust the third fitting plane parameter c on the basis of the following equation:

$$\hat{c} = \frac{\sum_{i=0}^{N-1} p_{rs}[i] - a_{CLIP}\sum_{i=0}^{N-1} x_i - b_{CLIP}\sum_{i=0}^{N-1} y_i}{N},$$

wherein $\hat{c}$ denotes the adjusted third fitting plane parameter, N denotes the number of reference samples, $p_{rs}[i]$ denotes the reference sample value at the position x, y, $a_{CLIP}$ denotes the clipped first fitting plane parameter, $b_{CLIP}$ denotes the clipped second fitting plane parameter.

In a further possible implementation form of the first aspect, the processing unit is configured to clip the first fitting plane parameter a and/or the second fitting plane parameter b and to adjust the third fitting plane parameter c on the basis of the following equations:

$$a_{CLIP}=\text{clip3}(-k_w \cdot K_{max}(C_C,L_W),k_w \cdot K_{max}(C_C,L_W),a(C_C))$$

$$b_{CLIP}=\text{clip3}(-k_w \cdot K_{max}(C_C,L_H),k_w \cdot K_{max}(C_C,L_H),b(C_C)),$$

wherein $a_{CLIP}$ denotes the clipped first fitting plane parameter, $b_{CLIP}$ denotes the clipped second fitting plane parameter, clip3( ) denotes a clipping function, $k_w$ denotes a weighting factor, $C_C$ denotes a color component, L denotes the length of block side defined by the reference samples of one of the neighboring video coding blocks of the set of neighboring video coding blocks (the subscript defines what side of a block is meant, i.e. W and H point out to horizontal/above and vertical/left sides of reference samples) and wherein the maximum absolute value $K_{max}(C_C, L)$ is defined by the following equation:

$$K_{max}(C_C, L) = \frac{V_{max}(C_C) - V_{min}(C_C)}{L},$$

wherein $V_{max}(C_C)$ denotes a maximum sample value, $V_{min}(C_C)$ denotes a minimum sample value and L denotes a width defined by the reference samples of one of the neighboring video coding blocks of the set of neighboring video coding blocks.

In a further possible implementation form of the first aspect, the maximum sample value $V_{max}(C_C)$ is the maximum of the reference samples in a first neighboring video coding block and the minimum sample value $V_{min}(C_C)$ is the minimum reference sample value of the reference samples in the first neighboring video coding block.

In a further possible implementation form of the first aspect, the maximum sample value $V_{max}(C_C)$ is the maximum of the samples of the frame and the minimum reference sample value $V_{min}(C_C)$ is the minimum of the samples of the frame.

In a further possible implementation form of the first aspect, the processing unit is configured to automatically determine the respective predefined ranges of allowable parameter values.

In a further possible implementation form of the first aspect, the processing unit is further configured to clip the samples, which have been predicted on the basis of the plurality of fitting samples defined by the adjusted fitting plane, in case the sample values lie outside of a predefined range of sample values.

In a further possible implementation form of the first aspect, the processing unit is configured to clip the fitting plane parameters such that the adjusted fitting plane values fall within a range of bit depth values, a range defined by the minimum and maximum sample values of the samples of the frame, and/or a range defined by the maximum and minimum value of the reference samples.

In a further possible implementation form of the first aspect, the set of neighboring video coding blocks of the current video coding block comprises a video coding block above the current video coding block and/or a video coding block to the left of the current video coding block.

According to a second aspect the disclosure relates to an encoding apparatus for encoding a current video coding block of a frame of a video signal, the current video coding block comprising a plurality of samples, each sample being associated with a sample value. The encoding apparatus comprises: an intra prediction apparatus according to the first aspect for providing a predicted video coding block; and an encoding unit configured to encode the current video coding block on the basis of the predicted video coding block.

Thus, an improved encoding apparatus for video coding is provided, which allows increasing the encoding efficiency for intra prediction.

According to a third aspect the disclosure relates to a decoding apparatus for decoding an encoded video coding block of a frame of a video signal, the encoded video coding block comprising a plurality of samples, each sample being associated with a sample value. The decoding apparatus comprises: an intra prediction apparatus according to the first aspect for providing a predicted video coding block; and a restoration unit configured to restore a video coding block on the basis of an encoded video coding block and the predicted video coding block.

Thus, an improved decoding apparatus for video coding is provided, which allows increasing the decoding efficiency for intra prediction.

According to a fourth aspect the disclosure relates to a method for intra prediction of a current video coding block of a frame of a video signal on the basis of a plurality of reference samples from a set of neighboring video coding blocks of the current video coding block, the frame comprising a plurality of samples, each sample being associated with a sample value and a position within the frame.

The method comprises: determining a preliminary fitting plane on the basis of the plurality of reference samples, wherein the preliminary fitting plane is defined by a set of preliminary fitting plane parameters; clipping those preliminary fitting plane parameters of the set of preliminary fitting plane parameters whose parameter value lies outside of a predefined range of allowable parameter values to an adjusted parameter value lying inside of the predefined range of allowable parameter values and maintaining those preliminary fitting plane parameters of the set of preliminary fitting plane parameters whose parameter value lies inside of the predefined range of allowable parameter values; determining an adjusted fitting plane on the basis of the clipped fitting plane parameters and the unclipped fitting plane parameters, wherein the adjusted fitting plane defines a plurality of fitting samples, each fitting sample being associated with a fitting sample value and a position within the frame; and predicting the samples of the current video coding block on the basis of the plurality of fitting samples defined by the adjusted fitting plane.

Thus, an improved method for video coding is provided, which allows increasing the coding efficiency for intra prediction.

The intra prediction method according to the fourth aspect of the disclosure can be performed by the intra prediction apparatus according to the first aspect of the disclosure. Further features of the intra prediction method according to the fourth aspect of the disclosure result directly from the functionality of the intra prediction apparatus according to the first aspect of the disclosure and its different implementation forms.

According to a fifth aspect the disclosure relates to a computer program comprising program code for performing the method according to the fourth aspect when executed on a computer.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which embodiments may be placed. It is understood that other aspects may be utilized and structural or logical changes may be made without departing from the scope of the disclosure. The following detailed description, therefore, is not to be taken in a limiting sense, as the scope of the disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
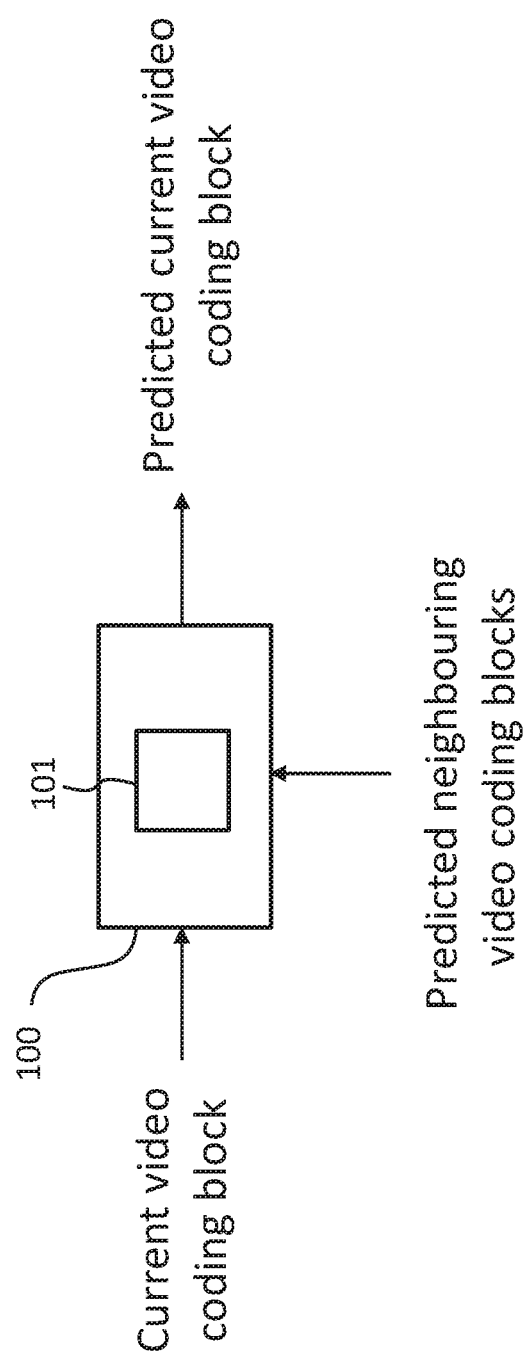
FIG. 1 shows a schematic diagram illustrating an intra prediction apparatus according to an embodiment.

FIG. 1 shows a schematic diagram illustrating an intra prediction apparatus 100 according to an embodiment.

Figure 4A:
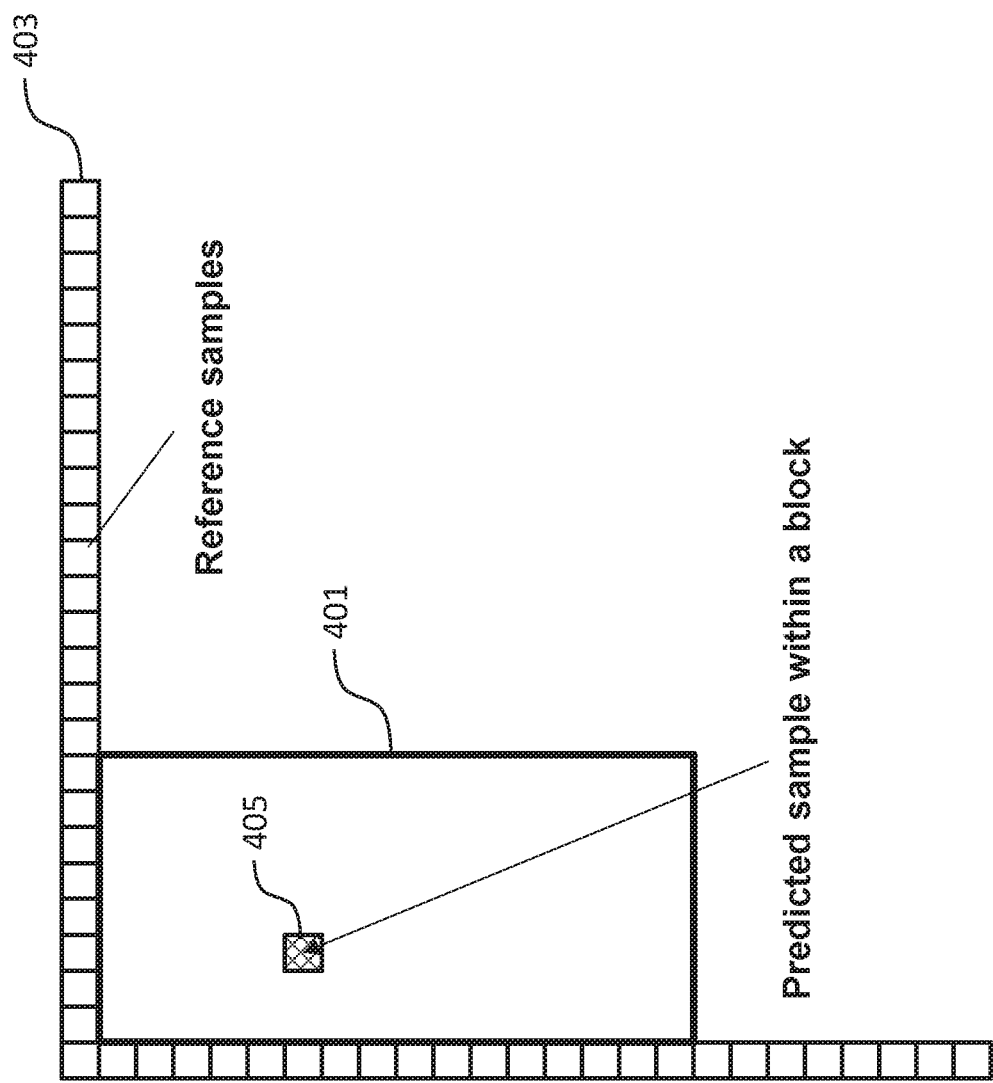
FIG. 4A shows a schematic diagram illustrating a video coding block to be predicted by an intra prediction apparatus according to an embodiment.

Under further reference to FIG. 4A, the intra prediction apparatus 100 is configured to intra predict a current video coding block 401 of a frame of a video signal on the basis of a plurality of reference samples 403 from a set of neighboring video coding blocks of the current video coding block 401, wherein the frame comprises a plurality of samples 405, each sample being associated with a sample value and a position within the frame.

As can be taken from FIG. 1, the intra prediction apparatus 100 comprises a processing unit 101 configured to determine a preliminary fitting plane 501 (shown in FIG. 4B) on the basis of the plurality of reference samples 403, wherein the preliminary fitting plane 501 is defined by a set of preliminary fitting plane parameters and to clip those preliminary fitting plane parameters of the set of preliminary fitting plane parameters whose respective parameter value lies outside of a predefined range of allowable parameter values to an adjusted parameter value lying inside of the predefined range of allowable parameter values and to maintain those preliminary fitting plane parameters of the set of preliminary fitting plane parameters whose respective parameter value lies inside of the predefined range of allowable parameter values.

The processing unit 101 is further configured to determine an adjusted fitting plane on the basis of the clipped fitting plane parameters and the unclipped fitting plane parameters, i.e. the preliminary fitting plane parameters of the set of preliminary fitting plane parameters whose respective parameter value lies inside of the predefined range of allowable parameter values. The adjusted fitting plane defines a plurality of fitting samples, wherein each fitting sample is associated with a fitting sample value and a position within the frame. The processing unit 101 is configured to predict the samples, such as the sample 405 shown in FIG. 4a, of the current video coding block 401 on the basis of the plurality of fitting samples defined by the adjusted fitting plane.

Figure 5:
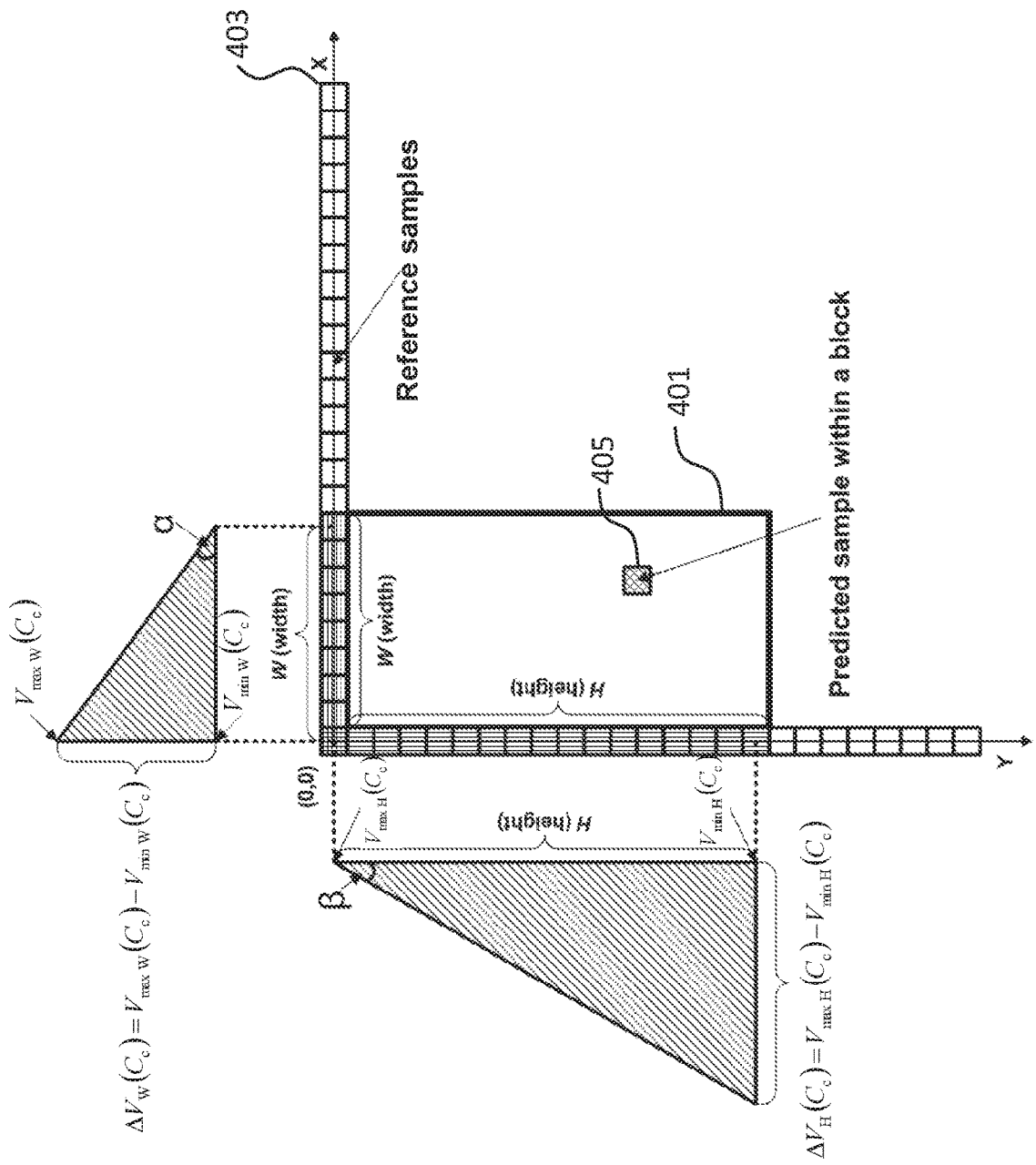
FIG. 5 shows a schematic diagram illustrating constraint values of fitting plane parameters determined by an intra prediction apparatus according to an embodiment.

As can be taken from FIGS. 4A and 5, in an embodiment, the set of neighboring video coding blocks of the current video coding block 401 comprises a video coding block above the current video coding block 401 and/or a video coding block to the left of the current video coding block 401.

Further embodiments of the intra prediction apparatus 100 will be described below.

Figure 2:
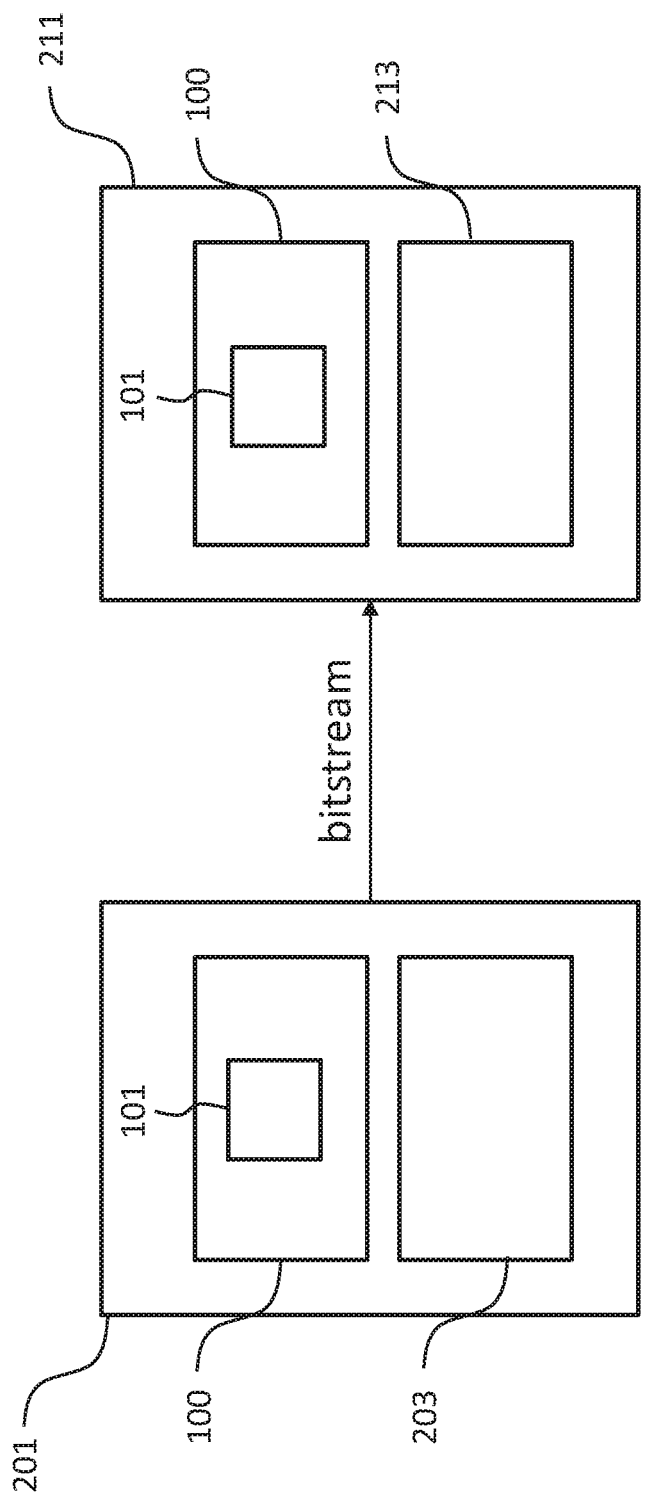
FIG. 2 shows a schematic diagram illustrating an encoding apparatus according to an embodiment and a decoding apparatus according to an embodiment.

FIG. 2 shows a schematic diagram illustrating an encoding apparatus 201 according to an embodiment and a decoding apparatus 211 according to an embodiment.

The encoding apparatus 201 is configured to encode a current video coding block 401 of a frame of a video signal, wherein the current video coding block 401 comprises a plurality of samples 405, each sample being associated with a sample value. The encoding apparatus 201 comprises the intra prediction apparatus 100 shown in FIG. 1 for providing a predicted video coding block and an encoding unit 203 configured to encode the current video coding block 401 on the basis of the predicted video coding block and providing the encoded current video coding block, for instance, in the form of a bitstream. Further embodiments of the encoding apparatus 201 will be described further below. In an embodiment, the encoding apparatus 201 could be implemented as a hybrid encoder, as defined, for instance, in the HEVC standard, and could comprise further components, such as an entropy encoder.

The decoding apparatus 211 is configured to decode the encoded video coding block of a frame of a video signal, which is contained in the bitstream provided by the encoding apparatus 201, wherein the encoded video coding block comprises a plurality of samples, each sample being associated with a sample value. The decoding apparatus 211 comprises the intra prediction apparatus 100 shown in FIG. 1 for providing a predicted video coding block and a restoration unit 213 configured to restore a video coding block on the basis of the encoded video coding block and the predicted video coding block. Further embodiments of the decoding apparatus 211 will be described further below. In an embodiment, the decoding apparatus 211 could be implemented as a hybrid decoder, as defined, for instance, in the HEVC standard, and could comprise further components, such as a decoding unit for providing a residual video coding block on the basis of the encoded video coding block.

Figure 3:
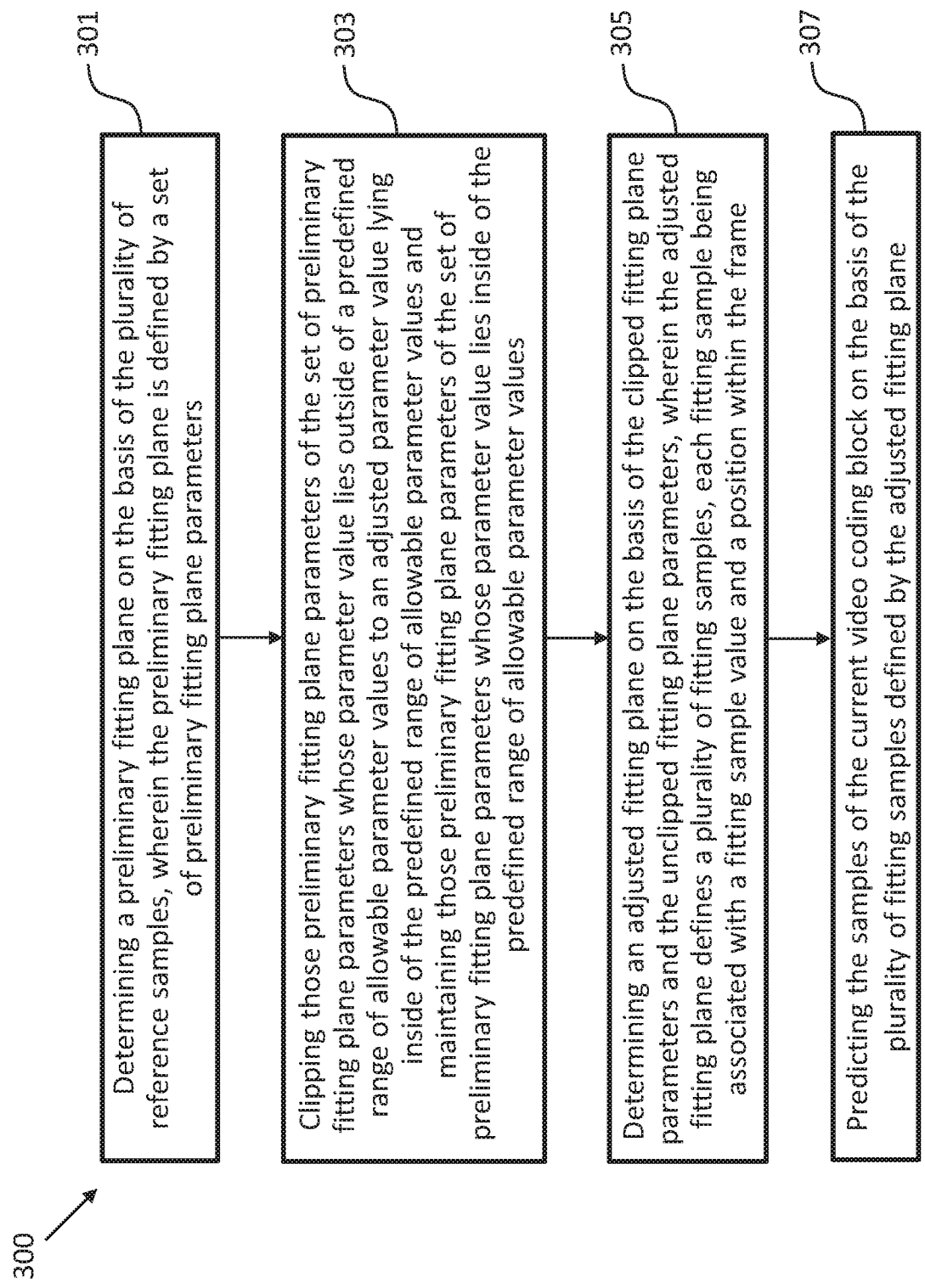
FIG. 3 shows a schematic diagram illustrating an intra prediction method according to an embodiment.

FIG. 3 shows a schematic diagram illustrating a method 300 for intra prediction of a current video coding block 401 of a frame of a video signal on the basis of a plurality of reference samples 403 from a set of neighboring video coding blocks of the current video coding block 401 according to an embodiment, wherein the frame comprises a plurality of samples 405 and each sample is associated with a sample value and a position within the frame.

The intra prediction method 300 comprises a step 301 of determining a preliminary fitting plane 501 on the basis of the plurality of reference samples 405, wherein the preliminary fitting plane 501 is defined by a set of preliminary fitting plane parameters.

Furthermore, the intra prediction method 300 comprises a step 303 of clipping those preliminary fitting plane parameters of the set of preliminary fitting plane parameters whose parameter value lies outside of a predefined range of allowable parameter values to an adjusted parameter value lying inside of the predefined range of allowable parameter values and maintaining those preliminary fitting plane parameters of the set of preliminary fitting plane parameters whose parameter value lies inside of the predefined range of allowable parameter values.

Finally, the intra prediction method 300 comprises a step 305 of determining an adjusted fitting plane on the basis of the clipped fitting plane parameters and the unclipped fitting plane parameters, wherein the adjusted fitting plane defines a plurality of fitting samples, each fitting sample being associated with a fitting sample value and a position within the frame and a step 307 of predicting the samples 405 of the current video coding block 401 on the basis of the plurality of fitting samples defined by the adjusted fitting plane. Further embodiments of the intra prediction method 300 will be described further below.

According to an embodiment of the disclosure, the intra prediction method 300 can be performed by the processing unit 101 of the intra prediction apparatus 100 mentioned above in FIG. 1. The detailed steps of the implementation form of the method 300 in the intra prediction apparatus 100 will be discussed further below.

FIG. 4A shows a schematic diagram of an exemplary current video coding block 401 illustrating an aspect of the intra prediction apparatus 100 and the intra prediction method 300 according to an embodiment, in particular the relationship between reference samples (also referred to as pixels) 403 and intra predicted samples or pixels, wherein the pixel of the currently processed video coding block 401, i.e. the currently processed pixel 405, is identified by a square with a diamond pattern and the reference pixels 403 are identified by squares.

For the exemplary current video coding block 401 shown in FIG. 4A, the reference samples or pixels 403 are the pixels in the row of pixels above the current video coding block 401 and the pixels in the column of pixels to the left of the current video coding block 401. Thus, in the embodiment shown in FIG. 4A, the reference pixels 403 belong to neighboring video coding blocks, which already have been intra predicted, i.e. processed by the intra prediction apparatus 100.

Figure 4B:
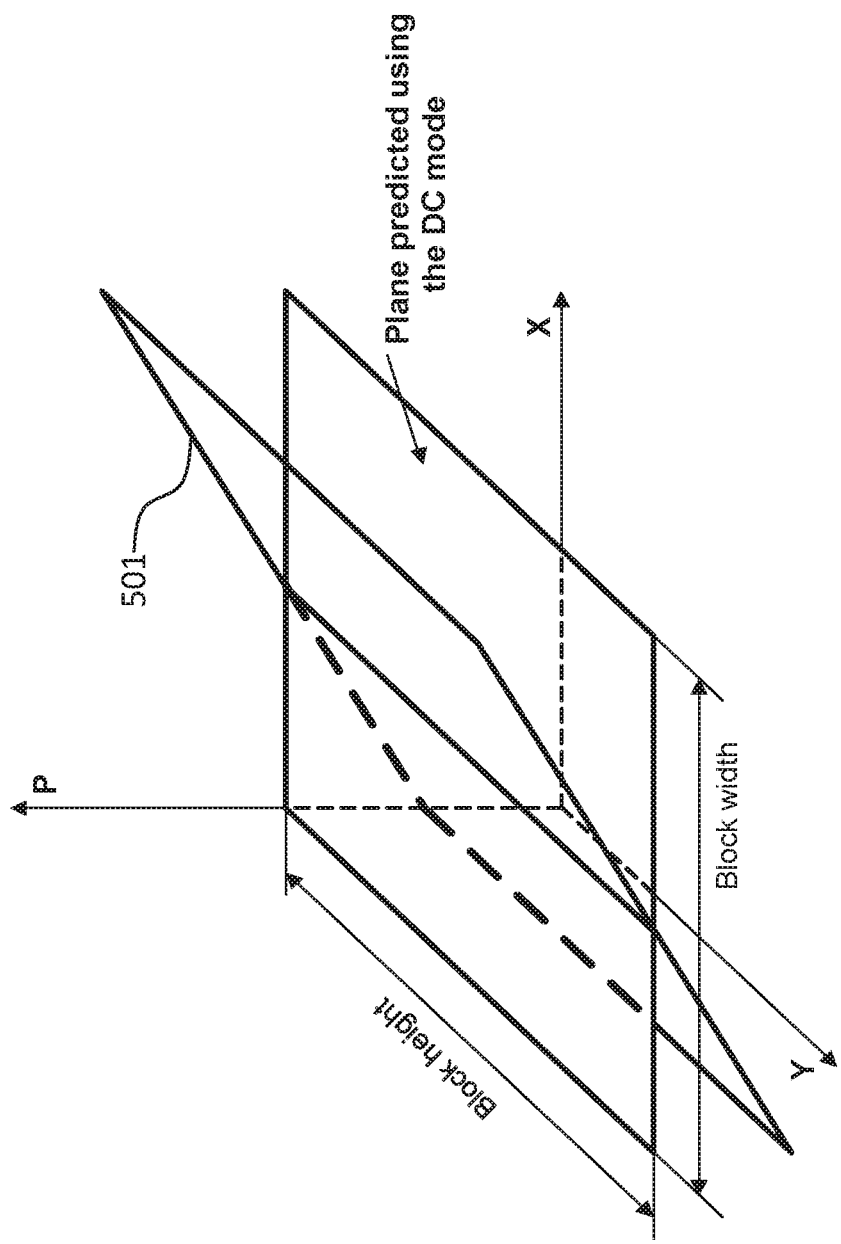
FIG. 4B shows a schematic diagram illustrating a fitting plane determined by an intra prediction apparatus according to an embodiment.

FIG. 4B shows a schematic diagram of a preliminary fitting plane 501 predicted by the processing unit 101 using, for instance, a MLR-based model, wherein the reference samples 403 as illustrated in FIG. 4A are used to estimate regression parameters of the MLR-based model for constructing the preliminary fitting plane 501. As a comparison, a fitting plane predicted by the DC mode in the HEVC/H.265 standard is also shown in FIG. 4B. Thus, the processing unit 101 is configured to estimate a set of preliminary parameters on the basis of a Multiple Linear Regression (MLR) and fit a preliminary plane 501 to the reference samples 403 (step 1).

More specifically, in an embodiment, the processing unit 101 is configured to determine the fitting plane 501 on the basis of the plurality of reference samples 403 by determining a set of fitting plane parameters, including a first fitting plane parameter a, a second fitting plane parameter b and a third fitting plane parameter c on the basis of the plurality of reference samples 403 such that the plurality of fitting sample values $\hat{p}_{pred}[x, y]$ are defined by the following equation:

$$\hat{p}_{pred}[x,y]=ax+by+c,$$

wherein x, y denote the position of the fitting sample within the frame.

In step 1, different approaches can be used for the Multiple Linear Regression (MLR). For instance, in an embodiment the processing unit 101 is configured to perform a Multi-Linear Regression, in particular a least-squares method, for determining the fitting plane parameters on the basis of the plurality of reference samples 403. This well-known least-square method provides such values of regression parameters that minimize the sum of error squares between the data (i.e. reference samples 403) used for estimating regression parameters and the values calculated using the above equation at the positions corresponding to the reference samples 403. In fact, this step can be similar to the plane-based mode employed in the H.264/AVC standard.

In a step 2, the processing unit 101 is configured to clip those preliminary fitting plane parameters of the set of preliminary fitting plane parameters whose respective parameter value lies outside of a predefined range of allowable parameter values to an adjusted parameter value lying inside of the predefined range of allowable parameter values and maintain those preliminary fitting plane parameters of the set of preliminary fitting plane parameters whose respective parameter value lies inside of the predefined range of allowable parameter values.

In an embodiment, the processing unit 101 is configured to clip the fitting plane parameters such that the adjusted fitting plane values fall within a range of bit depth values, a range defined by the minimum and maximum sample values of the samples of the frame, and/or a range defined by the maximum and minimum value of the reference samples.

Furthermore, the processing unit 101 can be further configured to automatically determine the respective predefined ranges of allowable parameter values according to an embodiment.

The basic idea behind step 2 is to constrain the values of the regression parameters a and b that define the inclination of the fitting plane to the xy-plane as illustrated in FIG. 4B. The detailed embodiments for clipping the fitting plane (regression) parameters a and b will be explained with reference to FIG. 5 further below.

FIG. 5 illustrates as an example the case, where the intra prediction apparatus 100 clips those preliminary fitting plane parameters a and b of the set of preliminary fitting plane parameters whose respective parameter value lies outside of a predefined range of allowable parameter values to an adjusted parameter value lying inside of the predefined range of allowable parameter values. In FIG. 5, the pixel of the currently processed video coding block 401 with a height H and a width W, i.e. the currently processed pixel 405, is identified by a square with a diamond pattern and the reference pixels or samples 403 are identified by squares.

As shown in FIG. 5, constraints that can be put on regression parameters a and b follow, for example, a gradient-based predictor model. In an ideal case, where the reference samples 403 in the row of samples above the current video coding block 401 or in the column of samples to the left of the current video coding block 401 change linearly, the drops, i.e. differences $\Delta V_W(C_c)$ and $\Delta V_H(C_c)$ between the reference sample at coordinate (0,0) and reference samples at the ends of the horizontal and vertical sides can be calculated by the following equations:

$$\Delta V_W(C_c)=V_{maxW}(C_c)-V_{minW}(C_c)$$

$$\Delta V_H(C_c)=V_{maxH}(C_c)-V_{minH}(C_c),$$

where $V_{max\,W}(C_c)$ and $V_{maxH}(C_c)$ are maximum values of pixels/samples for a color component $C_c$ at the horizontal and vertical sides of reference samples respectively; $V_{minW}(C_c)$ and $V_{minH}(C_c)$ are minimum values of pixels/samples for color component $C_C$ at the horizontal and vertical sides of reference samples respectively. Thus, the maximum absolute values $K_{maxW}(C_c,L)$ and $K_{maxH}(C_c,L)$ of regression parameters a and b can be calculated as follows:

$$\begin{aligned}K_{maxW}(C_c, L) &= \tan\alpha \\ &= (V_{maxW}(C_c) - V_{minW}(C_c))/W \\ &= (V_{maxW}(C_c) - V_{minW}(C_c))/2^w \\ &\approx (V_{maxW}(C_c) - V_{minW}(C_c) + 2^{w-1}) >> w\end{aligned}$$

$$\begin{aligned}K_{maxH}(C_c, L) &= \tan\beta \\ &= (V_{maxH}(C_c) - V_{minH}(C_c))/H \\ &= (V_{maxH}(C_c) - V_{minH}(C_c))/2^h \\ &\approx (V_{maxH}(C_c) - V_{minH}(C_c) + 2^{h-1}) >> h\end{aligned}$$

wherein $W=2^w$ and $H=2^h$ denote the width and height of the current video coding block 401 to be predicted respectively.

Maximum and minimum values of pixels for the color component $C_C$ at the horizontal and vertical sides of reference samples 403 can be defined in several ways. For example, they can be defined as maximum and minimum pixel values that are possible for a given bit depth (e.g., $p_{min}=0$ and $p_{max}=255$ for a bit depth 8, $p_{min}=0$ and $p_{max}=1023$ for a bit depth 10). Hence, $K_{maxW}(C_c,L)$ and $K_{maxH}(C_c,L)$ are the same for an entire video sequence and can be calculated once per sequence.

Furthermore, $V_{max\,W}(C_c)$ and $V_{maxH}(C_c)$ can be defined as actual minimum and maximum sample values appearing in coded pictures (i.e. they are the same values as used for adaptive clipping). Therefore, $K_{maxW}(C_c,L)$ and $K_{maxH}(C_c,L)$ are the same for an entire frame or slice and can be calculated once per frame or slice.

Furthermore, $V_{max\,W}(C_c)$ and $V_{maxH}(C_c) V_{max\,H}(C)$ can also be defined as minimum and maximum values within the reference samples 403 used for constructing the plane. Therefore, $K_{maxW}(C_c,L)$ and $K_{maxH}(C_c,L)$ can be individually calculated for each block.

In an embodiment, the processing unit 101 is configured to clip the first fitting plane parameter a and/or the second fitting plane parameter b on the basis of the following equations:

$$a_{CLIP}=\text{clip3}(-k_w \cdot K_{max}(C_C,L_W), k_w \cdot K_{max}(C_C,L_W), a(C_C))$$

$$b_{CLIP}=\text{clip3}(-k_w \cdot K_{max}(C_C,L_H), k_w \cdot K_{max}(C_C,L_H), b(C_C)),$$

wherein $a_{CLIP}$ denotes the clipped first fitting plane parameter, $b_{CLIP}$ denotes the clipped second fitting plane parameter, clip3( ) denotes a clipping function, $k_w$ denotes a weighting factor, $C_C$ denotes a color component, L denotes the length of block side defined by the reference samples of one of the neighboring video coding blocks of the set of neighboring video coding blocks (the subscript defines what side of a block is meant, i.e. W and H point out to horizontal/above and vertical/left sides of reference samples) and wherein the maximum absolute value $K_{max}$ $(C_C, L)$ is defined by the following equation:

$$K_{max}(C_C, L) = \frac{V_{max}(C_C) - V_{min}(C_C)}{L},$$

wherein $V_{max}(C_C)$ denotes a maximum sample value, $V_{min}(C_C)$ denotes a minimum sample value and L denotes a width defined by the reference samples of one of the neighboring video coding blocks of the set of neighboring video coding blocks.

In an embodiment, the maximum sample value $V_{max}(C_C)$ is the maximum of the reference samples in a first neighboring video coding block and the minimum sample value $V_{min}(C_C)$ is the minimum reference sample value of the reference samples in the first neighboring video coding block.

In an embodiment, the maximum sample value $V_{max}(C_C)$ is the maximum of the samples of the frame and the minimum reference sample value $V_{min}(C_C)$ is the minimum of the samples of the frame.

It is worth noting that constraints on regression parameters a and b can be calculated by using more complex models. In particular, the change of gradient can be considered for the main diagonal within a block to be predicted. In this case, stricter constraints can be deduced, such as $|a_{CLIP}W + b_{CLIP}H| \leq V_{max}(C_c) - V_{min}(C_c)$.

After the first fitting plane parameter a and the second fitting plane parameter b are clipped, the third fitting plane parameter c can be re-calculated, i.e. adjusted. More specifically, the processing unit 101 is configured to clip the first fitting plane parameter a and/or the second fitting plane parameter b and to adjust the third fitting plane parameter c on the basis of the following equation:

$$\hat{c} = \frac{\sum_{i=0}^{N-1} p_{rs}[i] - a_{CLIP}\sum_{i=0}^{N-1} x_i - b_{CLIP}\sum_{i=0}^{N-1} y_i}{N},$$

wherein $\hat{c}$ denotes the adjusted third fitting plane parameter, N denotes the number of reference samples, $p_{rs}[i]$ denotes the reference sample value at the position x, y, $a_{CLIP}$ denotes the clipped first fitting plane parameter, $b_{CLIP}$ denotes the clipped second fitting plane parameter.

After clipping, the plurality of fitting samples defined by the adjusted fitting plane can be calculated by the following equation according to an embodiment:

$$\tilde{p}_{pred}[x,y] = a_{CLIP}x + b_{CLIP}y + \hat{c}.$$

In a final step 3, the processing unit 101 is configured to clip the samples, which have been predicted on the basis of the plurality of fitting samples defined by the adjusted fitting plane, in case the sample values lie outside of a predefined range of sample values, and to predict the samples of the current video coding block 401 on the basis of the plurality of fitting samples defined by the adjusted fitting plane. If adaptive clipping is used, the following clipping mechanism can be applied to the plurality of fitting samples according to an embodiment:

$$p_{pred}[x,y] = \text{clip } A(a_{CLIP}x + b_{CLIP}y + \hat{c}, C_c).$$

Furthermore, the conventional clipping mechanism can also be used according to an embodiment:

$$p_{pred}[x,y] = \text{clip3}(p_{min}, p_{max}, a_{CLIP}x + b_{CLIP}y + \hat{c}),$$

where $p_{min}$ and $p_{max}$ are minimum and maximum values that pixels can take within the block 401 to be predicted.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the embodiments beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the embodiments may be practiced otherwise than as specifically described herein.

What is claimed is:

1. An apparatus for intra prediction of a current video coding block of a frame of a video signal on the basis of a plurality of reference samples from a set of neighboring video coding blocks of the current video coding block, the frame comprising a plurality of samples, each sample being associated with a sample value and a position within the frame, the apparatus comprising:
  a processing unit configured to:
    determine a preliminary fitting plane on the basis of the plurality of reference samples, wherein the preliminary fitting plane is defined by a set of preliminary fitting plane parameters;

clip, by a clip3( ) function, those preliminary fitting plane parameters of the set of preliminary fitting plane parameters having a parameter value that lies outside of a predefined range of allowable parameter values to an adjusted parameter value lying inside of the predefined range of allowable parameter values and maintain those preliminary fitting plane parameters of the set of preliminary fitting plane parameters having a parameter value that lies inside of the predefined range of allowable parameter values;

determine an adjusted fitting plane on the basis of the clipped fitting plane parameters and unclipped fitting plane parameters, wherein the adjusted fitting plane defines a plurality of fitting samples, each fitting sample being associated with a fitting sample value and a position within the frame; and predict the samples of the current video coding block on the basis of the plurality of fitting samples defined by the adjusted fitting plane.

2. The apparatus of claim 1, wherein the processing unit is configured to determine the fitting plane on the basis of the plurality of reference samples by determining the set of fitting plane parameters, including a first fitting plane parameter a, a second fitting plane parameter b and a third fitting plane parameter c on the basis of the plurality of reference samples such that the plurality of fitting sample values $\hat{p}_{pred}[x, y]$ are defined by the following equation:

$$\hat{p}_{pred}[x,y]=ax+by+c,$$

wherein x, y denote the position of the fitting sample within the frame.

3. The apparatus of claim 2, wherein the processing unit is configured to perform a multi-linear regression for determining the fitting plane parameters on the basis of the plurality of reference samples.

4. The apparatus of claim 2, wherein the processing unit is configured to clip one or both of the first fitting plane parameter a and the second fitting plane parameter b and to adjust the third fitting plane parameter c on the basis of the following equation:

$$\hat{c} = \frac{\sum_{i=0}^{N-1} p_{rs}[i] - a_{CLIP}\sum_{i=0}^{N-1} x_i - b_{CLIP}\sum_{i=0}^{N-1} y_i}{N},$$

wherein ĉ denotes the adjusted third fitting plane parameter, N denotes the number of reference samples, $p_{rs}[i]$ denotes the reference sample value at the position x, y, $a_{CLIP}$ denotes the clipped first fitting plane parameter, and $a_{CLIP}$ denotes the clipped second fitting plane parameter.

5. The apparatus of claim 2, wherein the processing unit is configured to clip one or both of the first fitting plane parameter a and the second fitting plane parameter b and to adjust the third fitting plane parameter c on the basis of the following equations:

$$a_{CLIP}=\text{clip3}(-k_w \cdot K_{max}(C_C, L_W), k_w \cdot K_{max}(C_C, L_W), a(C_C))$$

$$b_{CLIP}=\text{clip3}(-k_w \cdot K_{max}(C_C, L_H), k_w \cdot K_{max}(C_C, L_H), b(C_C)),$$

wherein $a_{CLIP}$ denotes the clipped first fitting plane parameter, $b_{CLIP}$ denotes the clipped second fitting plane parameter, clip3( ) denotes a clipping function, $k_w$ denotes a weighting factor, $C_C$ denotes a color component, L denotes the length of block side defined by the reference samples of one of the neighboring video coding blocks of the set of neighboring video coding blocks and wherein the maximum absolute value $K_{max}(C_C, L)$ is defined by the following equation:

$$K_{max}(C_C, L) = \frac{V_{max}(C_C) - V_{min}(C_C)}{L},$$

wherein $V_{max}(C_C)$ denotes a maximum sample value, $V_{min}(C_C)$ denotes a minimum sample value and L denotes a width defined by the reference samples of one of the neighboring video coding blocks of the set of neighboring video coding blocks.

6. The apparatus of claim 5, wherein the maximum sample value $V_{max}(C_C)$ is the maximum of the reference samples in a first neighboring video coding block and the minimum sample value $V_{min}(C_C)$ is the minimum reference sample value of the reference samples in the first neighboring video coding block.

7. The apparatus of claim 5, wherein the maximum sample value $V_{max}(C_C)$ is the maximum of the samples of the frame and the minimum reference sample value $V_{min}(C_C)$ is the minimum of the samples of the frame.

8. The apparatus of claim 1, wherein the processing unit is configured to automatically determine the respective predefined ranges of allowable parameter values.

9. The apparatus of claim 1, wherein the processing unit is further configured to clip the samples, which have been predicted on the basis of the plurality of fitting samples defined by the adjusted fitting plane, when the sample values lie outside of a predefined range of sample values.

10. The apparatus of claim 1, wherein the processing unit is configured to clip the fitting plane parameters such that the adjusted fitting plane values fall within at least one of a range of bit depth values, a range defined by the minimum and maximum sample values of the samples of the frame, and a range defined by the maximum and minimum value of the reference samples.

11. The apparatus of claim 1, wherein the set of neighboring video coding blocks of the current video coding block comprises one or both of a video coding block above the current video coding block and a video coding block to the left of the current video coding block.

12. An encoding apparatus for encoding a current video coding block of a frame of a video signal, the current video coding block comprising a plurality of samples, each sample being associated with a sample value, the encoding apparatus comprising:

an intra prediction apparatus according to claim 1 for providing a predicted video coding block; and an encoding unit configured to encode the current video coding block on the basis of the predicted video coding block.

13. A decoding apparatus for decoding an encoded video coding block of a frame of a video signal, the encoded video coding block comprising a plurality of samples, each sample being associated with a sample value, the decoding apparatus comprising:

an intra prediction apparatus according to claim 1 for providing a predicted video coding block; and the intra prediction apparatus further configured to restore a video coding block on the basis of an encoded video coding block and the predicted video coding block.

14. A method for intra-prediction of a current video coding block of a frame of a video signal on the basis of a plurality of reference samples from a set of neighboring video coding blocks of the current video coding block, the frame comprising a plurality of samples, each sample being associated with a sample value and a position within the frame, the method comprising:

determining a preliminary fitting plane on the basis of the plurality of reference samples, wherein the preliminary fitting plane is defined by a set of preliminary fitting plane parameters;

clipping, by a clip3( ) function, those preliminary fitting plane parameters of the set of preliminary fitting plane parameters having a parameter value that lies outside of a predefined range of allowable parameter values to an adjusted parameter value lying inside of the predefined range of allowable parameter values and maintaining those preliminary fitting plane parameters of the set of preliminary fitting plane parameters having a parameter value that lies inside of the predefined range of allowable parameter values;

determining an adjusted fitting plane on the basis of the clipped fitting plane parameters and unclipped fitting plane parameters, wherein the adjusted fitting plane defines a plurality of fitting samples, each fitting sample being associated with a fitting sample value and a position within the frame; and predicting the samples of the current video coding block on the basis of the plurality of fitting samples defined by the adjusted fitting plane.

15. A non-transitory computer-readable medium comprising program code which, when executed by a processor, causes the method of claim 14 to be performed.

16. The apparatus of claim 3, wherein the multi-linear regression includes a least-squares method.

* * * * *